United States Patent
Ruth

[11] Patent Number: 6,116,394
[45] Date of Patent: Sep. 12, 2000

[54] OVERRUNNING COUPLING ASSEMBLY

[75] Inventor: Stephen M. Ruth, Chesterfield, Va.

[73] Assignee: Means Industries, Inc., Saginaw, Mich.

[21] Appl. No.: 09/374,732

[22] Filed: Aug. 13, 1999

[51] Int. Cl.[7] .................................................. F16D 41/12
[52] U.S. Cl. .............................. 192/46; 60/345; 192/69.1
[58] Field of Search .......................... 192/46, 69.1, 45.1; 74/576; 60/345

[56] References Cited

U.S. PATENT DOCUMENTS

| | | |
|---|---|---|
| 5,070,978 | 12/1991 | Pires . |
| 5,597,057 | 1/1997 | Ruth et al. . |
| 5,690,202 | 11/1997 | Myers . |
| 5,829,565 | 11/1998 | Fergle et al. . |
| 5,852,932 | 12/1998 | Matsumoto . |
| 5,855,263 | 1/1999 | Fergle . |
| 5,871,071 | 2/1999 | Sink . |
| 5,918,715 | 7/1999 | Ruth et al. ................................. 192/46 |
| 5,927,455 | 7/1999 | Baker et al. ........................... 192/46 X |
| 5,964,331 | 10/1999 | Reed et al. .................................. 192/46 |

*Primary Examiner*—Rodney H. Bonck
*Attorney, Agent, or Firm*—Brooks & Kushman P.C.

[57] ABSTRACT

An overrunning coupling assembly includes a notch plate and an annular coupling pocket plate positioned in face-to-face relationship with respect to each other along a common axis. The pocket plate includes strut pockets disposed at angularly spaced positions about the axis. The notch plate includes notch recesses at angularly spaced positions about the common axis and positioned in juxtaposed relationship with respect to the strut pockets. The notch plate includes an inner circumferential rail at a radially inward side of the notch recesses and an outer circumferential rail at a radially outward side of the notch recesses. Torque-transmitting struts are positioned in the strut pockets. Each strut has first and second ears at one edge thereof for enabling pivotal motion of the struts about an ear axis intersecting the ears. The opposite edge of each strut is engageable with one of the notch recesses whereby one-way torque transfer may occur between the plates. Each opposite edge has first and second corners. Each strut pocket is sufficiently enlarged to allow pivotal movement of each strut about a strut axis which is parallel with the common axis, thereby enabling one of the first and second corners to be selectively supported by one of the inner and outer circumferential rails to prevent the struts from slapping against the notch recesses as the notch plate and pocket plate are respectively counterrotated.

12 Claims, 5 Drawing Sheets

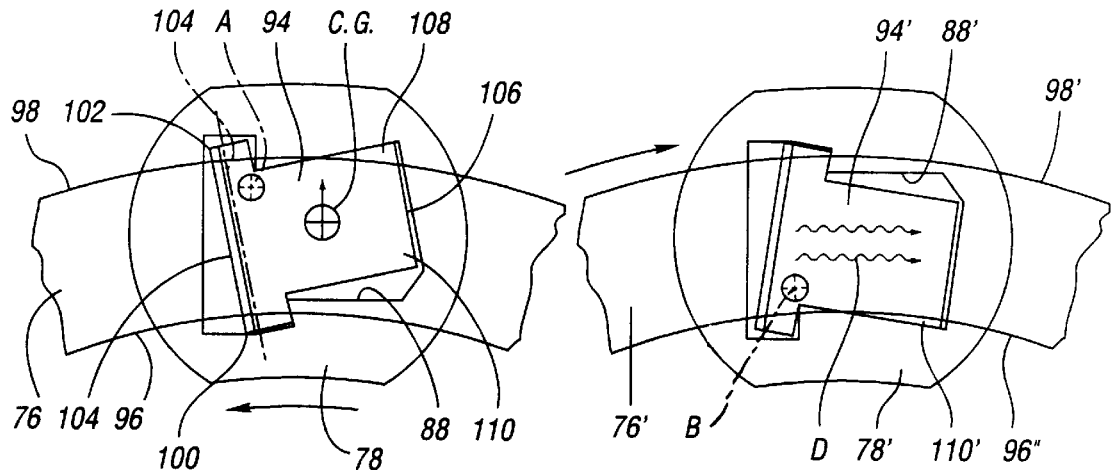
*Fig. 7*  *Fig. 7a*
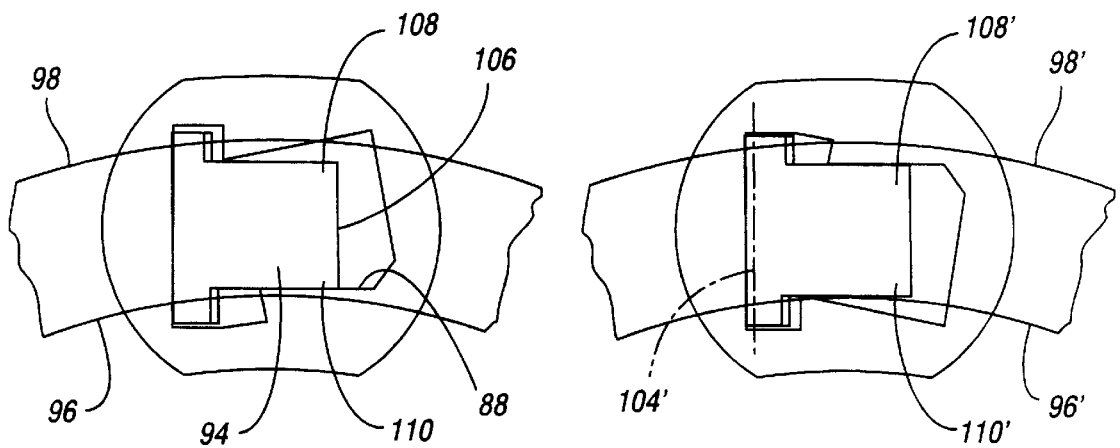
*Fig. 8*  *Fig. 8a*

OVERRUNNING COUPLING ASSEMBLY

TECHNICAL FIELD

The invention relates to an overrunning coupling assembly including enlarged strut pockets so that the struts are radially movable to be supported on an inner or outer rail adjacent the notch recesses to prevent slapping of the struts against the notch recesses.

BACKGROUND ART

The invention is adapted especially for use in stator assemblies for torque converter transmissions in an automotive vehicle driveline. The invention may be used also in other applications, however, such as torque transfer drives and chain drives that require an overrunning coupling in a torque flow path.

Torque converter transmissions include a stator assembly having a stator hub secured to a stationary sleeve shaft and stator blades situated between a toroidal flow exit section of a hydrokinetic turbine and the toroidal flow entrance section of a hydrokinetic impeller. The blades of the stator change the direction of the tangential component of the toroidal flow velocity vector at the turbine exit section prior to entry of the toroidal flow to the impeller entrance section. This permits multiplication of torque as the hydrokinetic converter delivers engine power to a power input element of multiple ratio gearing in the transmission mechanism.

It is known practice in the automotive transmission art to design the stator assembly of a hydrokinetic torque converter transmission with a stator hub that is adapted to receive an overrunning coupling having an outer race and an inner race, the inner race being splined to a stationary sleeve shaft and the outer race being carried by the bladed section of the stator assembly. The outer race typically would be cammed to provide a plurality of cam surfaces that are engageable by overrunning coupling rollers. The overrunning coupling permits reaction torque delivery from the stator blades to the stationary sleeve shaft when the torque converter is in a torque multiplication mode. The rollers and the cam surfaces with which they interact will permit free-wheeling motion of the bladed section of the converter when the torque converter is in a coupling mode.

The outer race of a conventional overrunning stator coupling is keyed or splined in a central opening in the stator hub. It is held in place by snap rings located in snap ring grooves machined in the stator hub.

My prior U.S. Pat. No. 5,597,057, which is owned by the assignee of the present invention, and which is hereby incorporated by reference in its entirety, provides an improved overrunning coupling assembly having an annular coupling pocket plate with strut pockets disposed therein and a notch plate disposed in face-to-face relationship with the pocket plate. The notch plate includes notch recesses at angularly spaced positions about the axis and disposed in juxtaposed relationship with respect to the strut pockets. Torque-transmitting struts are positioned in the strut pockets and spring-biased for engagement with the notch recesses.

Further improvements in overrunning coupling designs are desirable, particularly those improvements which reduce manufacturing costs and eliminate wear issues. For example, one potential problem associated with the above-referenced overrunning coupling design is that a certain amount of noise may be generated by the struts "slapping" or rattling against the notch recesses of the notch plate. Also, wear of the strut on top and edge surfaces during overrun may be a concern. It is also desirable to eliminate the need for constant and controlled lubrication.

DISCLOSURE OF INVENTION

The present invention improves upon prior overrunning coupling designs by providing enlarged strut pockets which allow radial sliding movement of the struts so that the struts may be supported by an inner or outer rail of the notch plate to prevent slapping of the struts against the notch recesses and to reduce wear issues and eliminate lubrication control requirements.

More specifically, the present invention provides an overrunning coupling assembly including a notch plate and an annular coupling pocket plate positioned in face-to-face relationship with respect to each other along a common axis. The pocket plate includes strut pockets disposed at angularly spaced positions about the common axis. The notch plate includes notch recesses at angularly spaced positions about the common axis and positioned in juxtaposed relationship with respect to the strut pockets. The notch plate includes an inner circumferential rail at a radially inward side of the notch recesses and/or an outer circumferential rail at a radially outward side of the notch recesses. A torque-transmitting strut is positioned in each strut pocket. Each strut has first and second ears at one edge thereof for enabling pivotal motion of the struts about an ear axis intersecting the ears. The opposite edge of each strut is engageable with one of the notch recesses whereby one-way torque transfer may occur between the plates. Each opposite edge has first and second corners. Each strut pocket is sufficiently enlarged to allow pivotal movement of each strut about a strut axis which is parallel with the common axis, thereby enabling one of the first and second corners to be selectively supported by one of the inner and outer circumferential rails to prevent the struts from slapping against the notch recesses as the notch plate and pocket plate are respectively counterrotated.

In one embodiment, each strut pocket is configured to allow radial outward movement of each strut as a result of centrifugal force acting on the strut so that the first corner is supported by the outer circumferential rail during high speed counterrotation.

In an alternative embodiment, each strut pocket is configured to allow radial inward movement of each strut to a position in which the second corner is supported by the inner circumferential rail as a result of viscous drag causing pivotal movement of the strut as rotational speed increases.

The invention described herein eliminates the noise of struts slapping against the notch plate and eliminates wear issues of the strut top and edge surfaces during overrun. It also eliminates wear issues of the spring loop against the bottom of the strut and eliminates lubrication control requirements. This design adds no cost to the manufacturing process and offers improved flexibility to alternate materials for the various components.

Accordingly, an object of the present invention is to provide an improved overrunning coupling design in which the noise of struts slapping against the notch plate is eliminated.

A further object of the present invention is to provide an improved overrunning coupling assembly in which fluid lubrication volume requirements are significantly reduced and lubrication control requirements are eliminated.

A still further object of the present invention is to provide an improved overrunning coupling assembly which is less expensive to manufacture and offers improved flexibility for alternate materials for various components while eliminating wear issues for the strut.

The above objects and other objects, features, and advantages of the present invention are readily apparent from the following detailed description of the best modes for carrying out the invention when taken in connection with the accompanying drawings.

BRIEF DESCRIPTION OF DRAWINGS

FIG. 7 shows a schematic plan view of a notch plate, pocket plate, and strut in accordance with the invention with a corner of the strut sliding along an outer circumferential rail of the notch plate;

FIG. 7a shows a schematic plan view of a notch plate, pocket plate, and strut in accordance with an alternative embodiment of the invention wherein a corner of the strut slides along an inner circumferential rail of the notch plate;

FIG. 8 shows a schematic plan view of the assembly of FIG. 7 wherein the strut is positioned for engagement with the notch recesses; and FIG. 8a shows a schematic plan view of the assembly of FIG. 7a wherein the strut is positioned for engagement with the notch recesses.

BEST MODES FOR CARRYING OUT THE INVENTION

Figure 1:
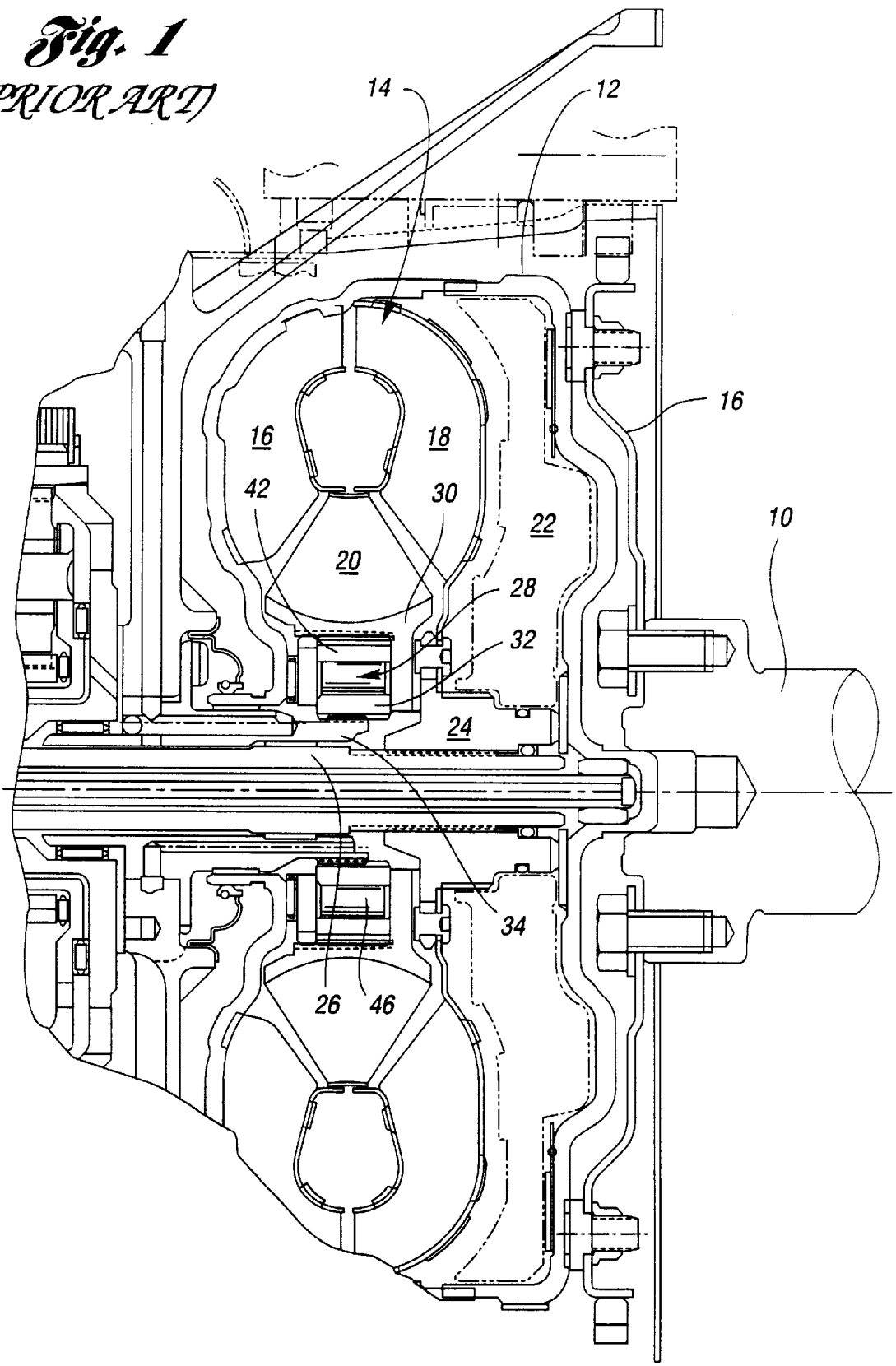
FIG. 1 shows a prior art hydrokinetic torque converter that comprises an impeller, a turbine, and a stator, the stator having a stator hub with a conventional overrunning coupling.

Shown in FIG. 1 is a prior art torque converter. An engine crankshaft 10 is connected drivably to impeller shell 12 of the hydrokinetic torque converter, generally identified by reference numeral 14. This connection is provided by drive plate 15. The impeller shell forms a part of a bladed impeller 16, which is arranged in a torque converter toroidal flow circuit partly defined by turbine 18. A bladed stator 20 is situated between the flow exit section of the turbine and the flow entrance section of the impeller. A torque converter lock-up clutch, not shown, would be located as shown in phantom at 22 in FIG. 1. This clutch, when it is applied, would connect the impeller with the turbine.

Turbine 18 includes a turbine hub 24 which is splined to turbine sleeve shaft 26. The torque input element of the planetary gearing (not shown) is connected drivably to the turbine sleeve shaft.

An overrunning coupling 28 of a conventional prior art design is disposed in the hub 30 of the stator 20. It includes an inner race 32, also shown in FIG. 2, which is splined to a stationary stator sleeve shaft 34 secured to or formed as part of the transmission housing.

Figure 2:
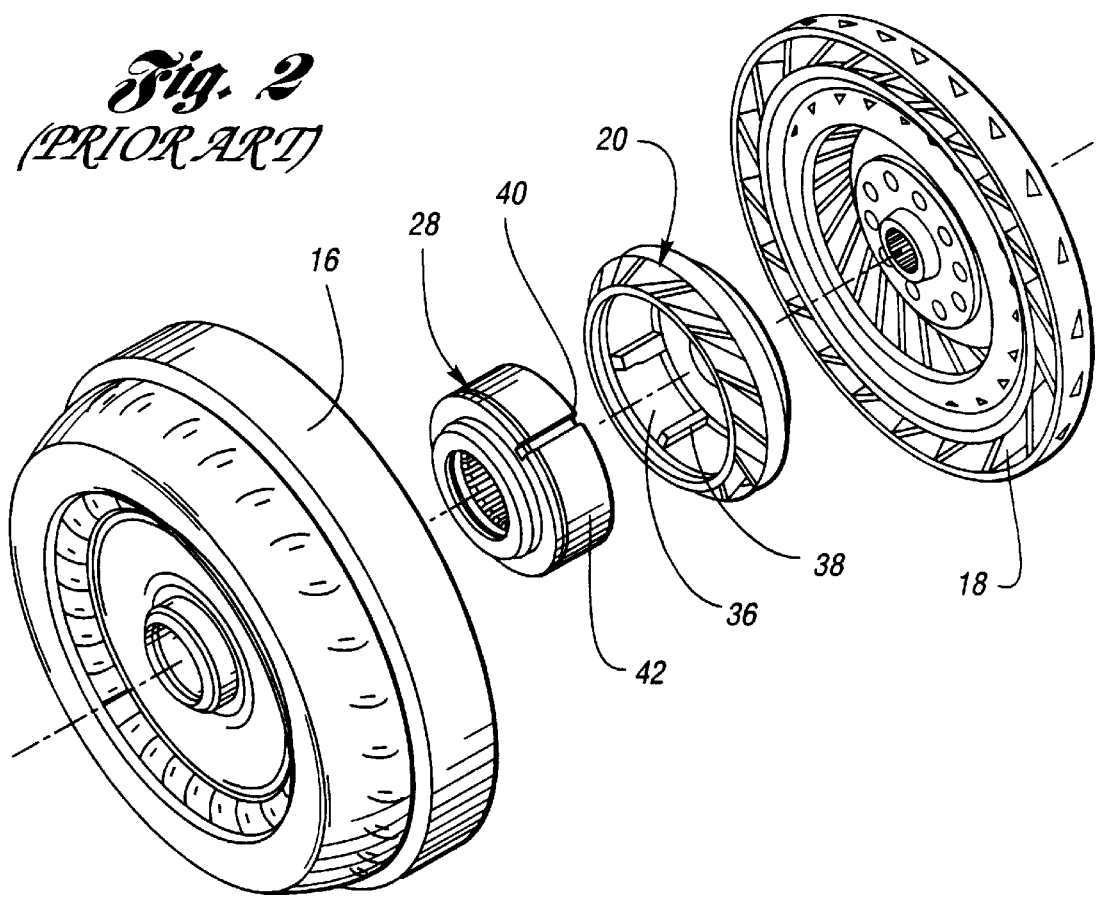
FIG. 2 is a schematic, exploded isometric view of a stator and an overrunning coupling for a stator together with an impeller and a turbine of the kind illustrated in the torque converter cross-sectional view of FIG. 1.

FIG. 2 shows in isometric form an exploded view of the stator, the turbine, and the impeller of FIG. 1. Each of these converter elements includes bladed toroidal fluid flow passages. The passages of the stator change the tangential fluid flow velocity vector as fluid leaves the flow exit section of the turbine and enters the flow entrance section of the impeller.

The stator 20 has a hub 36 which is formed with internal spline teeth or keys 38 adapted to be received in axial keyways or tooth spaces 40 in an outer race 42 for the conventional overrunning coupling 28.

Figure 3:
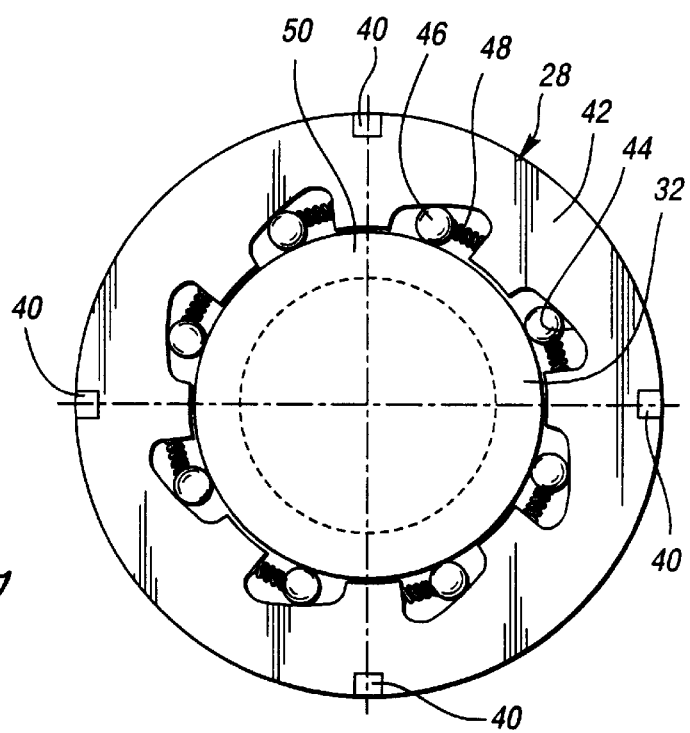
FIG. 3 is a schematic, cross-sectional view of a prior art overrunning roller coupling which may be used in a torque converter hub.

As shown in the schematic view of FIG. 3, prior art coupling 28 comprises a series of cam recesses 44 at angularly spaced locations. Each recess receives a coupling roller 46. A roller spring 48 urges each roller into camming engagement with a cam surface defined by its associated recess 44 so that the rollers are in wedging engagement with the periphery of the inner race 32. Free-wheeling motion of the outer race relative to the inner race thus may take place in one direction, but relative rotation is prevented by the wedging rollers when a torque reversal on the stator 20 takes place.

Figure 4:
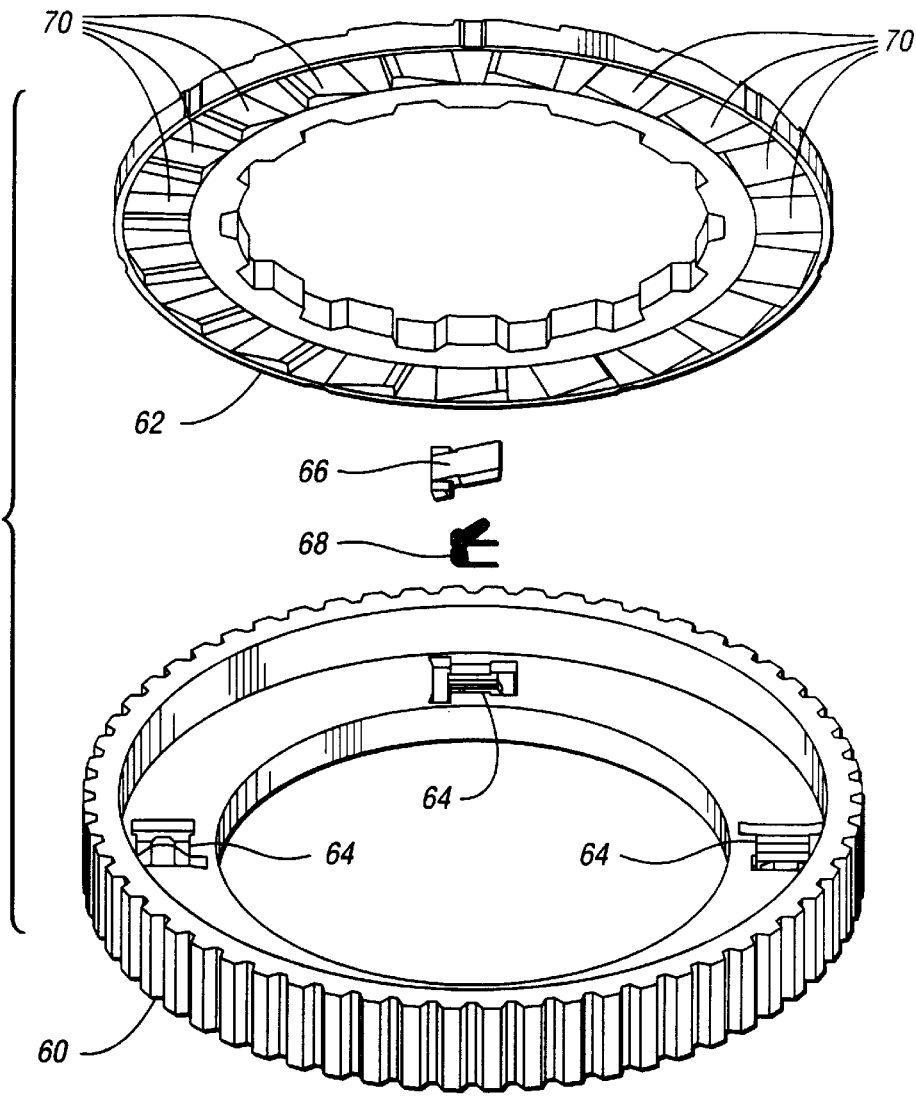
FIG. 4 shows an exploded perspective view of an overrunning coupling as described in co-pending U.S. patent application Ser. No. 09/028,904, which is incorporated by reference herein.
Figure 4A:
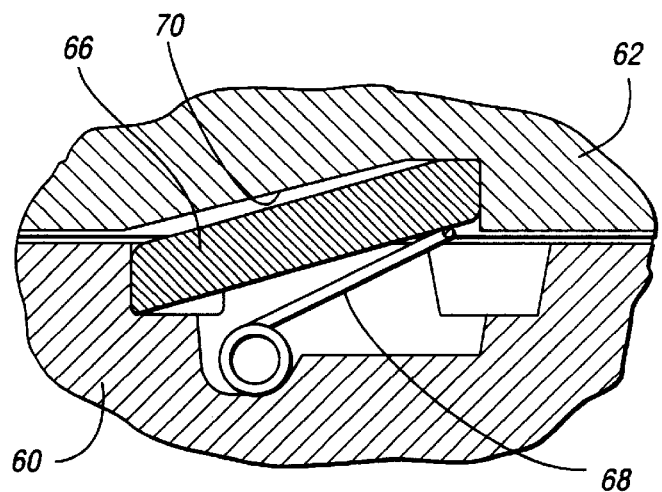
FIG. 4a shows an enlarged partial cross-sectional view of the assembly of FIG. 4.

Turning to FIGS. 4 and 4a, an overrunning coupling assembly 59 is shown as described in commonly owned U.S. patent application Ser. No. 09/028,904, which is incorporated by reference herein. As shown, the assembly 59 includes a pocket plate 60 positioned adjacent a notch plate 62, wherein the pocket plate 60 includes strut pockets 64 configured to receive struts 66 which are spring-biased by a spring 68 for engagement within ramped notch recesses 70 for one-way torque transmission.

During overrunning, the spring 68 biases the strut 66 toward the notch plate 62, which may cause the strut 66 to slap or rattle against the notch recesses 70 of the notch plate 66. This "slapping" against the notch plate may cause noise. The present invention is an improvement upon this design, and is particularly useful in eliminating this "slapping" problem, as well as eliminating wear issues and lubrication control requirements. The present invention is described below with reference to FIGS. 5–8a.

Figure 5:
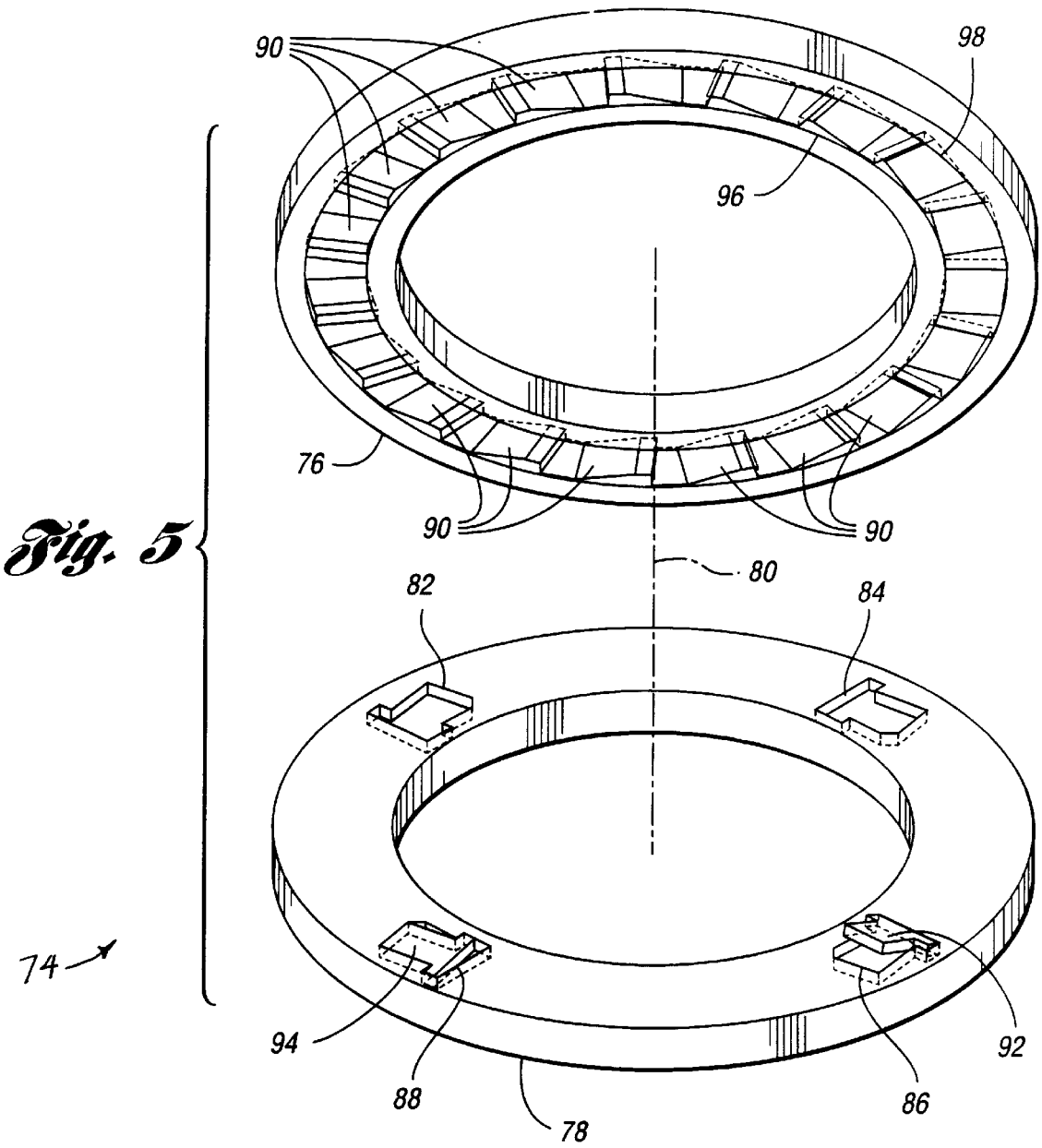
FIG. 5 shows an exploded perspective view of a notch plate, pocket plate, and strut in accordance with the present invention.
Figure 6:
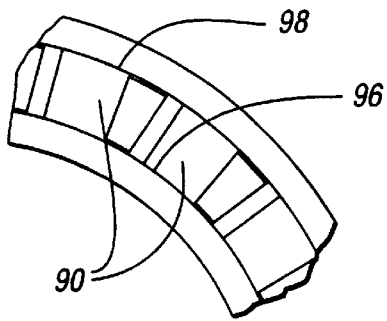
FIG. 6 shows a partial plan view of the notch plate of FIG. 5.

Referring to FIG. 5, an overrunning coupling assembly 74 is shown in accordance with the present invention. The overrunning coupling assembly 74 includes a notch plate 76 and an annular coupling pocket plate 78 positioned in face-to-face relationship with respect to each other along a common axis 80. The pocket plate 78 includes four strut pockets 82, 84, 86, 88 disposed at angularly spaced positions about the axis 80.

The notch plate 76 includes notch recesses 90 at angularly spaced positions about the common axis 80. With the notch plate 76 and pocket plate 78 positioned in face-to-face relationship, the notch recesses 90 are positioned in juxtaposed relationship with respect to the strut pockets 82, 84, 86, 88, similar to the structure described with reference to FIGS. 4 and 4a. The strut pockets 82, 84, 86, 88 are similarly ramped, and the struts 92, 94 are spring-loaded toward the notch plate 76 (similar to the structure shown in FIG. 4a).

The notch plate 76 includes an inner circumferential rail 96 and an outer circumferential rail 98. The inner circumferential rail 96 is positioned at a radially inward side of the notch recesses 90, and the outer circumferential rail 98 is positioned at a radially outward side of the notch recesses 90. The inner circumferential rail 96 and outer circumferential rail 98 form a contact plane above the notch recesses 90 so that the struts 92,94 may slide therealong during overrunning without falling into the notch recesses to prevent slapping of the struts 92,94 against the notch recesses 90. The inner circumferential rail 96 and outer circumferential rail 98 are more clearly shown in FIG. 6.

As shown in FIG. 5, the struts 92,94 are positioned in the strut pockets 86,88, respectively (only two are shown for illustrative purposes). Strut 92 is shown in the lock-up position wherein it is engaged with a notch recess 90, and the strut 94 is shown in the overrun position wherein it would slide along the outer circumferential rail 98, as described below.

Turning to FIG. 7, each strut 94 has first and second ears 100,102 at one edge 104 thereof which are held within the strut pocket 88 by the rails 96,98 for enabling pivotal motion of the strut 94 about an ear axis 104 intersecting the ears 100,102.

The opposite edge 106 of each strut is engageable with one of the notch recesses 90 when in the lock-up position as illustrated by strut 92 of FIG. 5 and strut 94 of FIG. 8. Accordingly, one-way torque transfer may occur between the plates. Each strut 92,94 includes first and second corners 108,110 at the opposite edge 106.

As illustrated in FIGS. 5, 7 and 8, each strut pocket 82, 84, 86, 88 is sufficiently enlarged to allow pivotal movement of each strut 92,94 about a strut axis A, shown in FIG. 7. The strut axis A referenced in FIG. 7 is perpendicular to the drawing page as viewed in FIG. 7 such that the strut axis A is parallel with the common axis 80 when assembled. The strut axis A is also perpendicular to the ear axis 104.

As illustrated in FIGS. 7 and 8, each strut pocket 88 is configured to allow pivotal movement of the strut 94 about the strut axis A between the position shown in FIG. 8, wherein the corners 108,110 are between the rails 96,98 so that the strut 94 is positioned for lock-up within the notch recesses 90, and the position shown in FIG. 7, wherein the first corner 108 of the strut 94 is supported by the outer circumferential rail 98 during high speed counterrotation of the notch plate 76 with respect to the pocket plate 78.

Accordingly, when relative rotation is experienced between the notch plate 76 and the pocket plate 78, at some point the centrifugal force of the center of gravity (CG) of the strut 94 overcomes the frictional forces of lubricating fluid within the assembly and metal-to-metal friction, and the strut 94 pivots outward about the axis A from the position shown in FIG. 8 to the position shown in FIG. 7 so that the first corner 108 of the strut 94 rides along the outer circumferential rail 98. In this position, the strut 94 is unable to "slap" along the recesses 90, which would create undesirable noise.

In a preferred embodiment, this pivotal motion of the strut 94 from the position shown in FIG. 8 to the position shown in FIG. 7 occurs at approximately 250 rpms. At high rotational speeds, vibration or noise may occur without the enlarged configuration of the strut pockets 88, therefore significant lubrication is required to prevent noise and to reduce wear on the various components. However, with the present invention, the noise is substantially eliminated, and only incidental lubrication is required. Also, the weir, which was used in prior designs to control oil level, is eliminated. Additionally, volumetric requirements for hydraulic dampening are eliminated. This also allows the struts to be heat treated because wear of the struts is no longer an issue, and the design of the leaf spring which forces the struts 92,94 against the recesses 90 may be simplified because fatigue cycles become non-existent with this design.

If desired, rapid deceleration of the pocket plate 78 may be used to cause the strut 94 to rotate back into its lock-up position shown in FIG. 8 prior to engagement if desired.

Referring to FIGS. 7a and 8a, an alternative embodiment of the invention is shown. In this embodiment, the pocket plate 78' is stationary, and the notch plate 76' is rotating. The strut pocket 88' is configured to allow pivotal motion of the strut 94' about the strut axis B between the position shown in FIG. 8a, wherein the corners 108' and 110' are between the inner and outer circumferential rails 96', 98' to allow pivotal movement about the ear axis 104' for lock-up, and the position shown in FIG. 7a, wherein the strut 94' is pivoted about the axis B to a position in which the second corner 110' is supported by the inner circumferential rail 96' of the notch plate 78' to prevent "slapping" of the strut 94' along the notch recesses.

In the embodiment of FIGS. 7a and 8a, pivotal movement of the strut 94' about the strut axis B is caused by viscous drag D of oil across the strut 94' and friction of the notch plate 76' engaging the strut 94', thereby causing rotation of the strut 94' about the strut axis B to the position shown in FIG. 7a.

The specific components and the level of lubrication are optimally designed to control the rotational speed at which the strut 94' would rotate or slide into the position shown in FIG. 7a wherein the strut is guided and stabilized. Also, the viscous and frictional drag effects can be optimally designed into the various components in order to realign the strut 94' back into its lock-up position shown in FIG. 8a when desired.

One skilled in the art will appreciate that modifications may be made to the preferred embodiments described herein within the scope of the claimed invention. For example, for the alternative designs described with reference to FIGS. 7–8 and FIGS. 7a and 8a, the inner and outer circumferential rails 96,98 are not both required, and the unused rail may be eliminated. Also, various strut pocket configurations may be used to allow the sliding or pivoting movement of the strut for positioning of a corner or edge along a supporting rail for stabilization. Also, the notch recesses and strut pockets may be switched between the notch plate and pocket plate and still achieve the desired function.

Therefore, those familiar with the art to which this invention relates will recognize various alternative designs and embodiments for practicing the invention within the scope of the appended claims.

What is claimed is:

1. An overrunning coupling comprising:

a notch plate and an annular coupling pocket plate positioned in face-to-face relationship with respect to each other along a common axis;

said pocket plate having strut pockets disposed at angularly spaced positions about said axis;

said notch plate having notch recesses at angularly spaced positions about said common axis and positioned in juxtaposed relationship with respect to said strut pockets, said notch plate including an inner circumferential rail at a radially inward side of the notch recesses and an outer circumferential rail at a radially outward side of the notch recesses; and torque-transmitting struts in said strut pockets, each strut having first and second ears at one edge thereof for enabling pivotal motion of the struts about an ear axis intersecting the ears, the opposite edge of each strut being engageable with one of said notch recesses whereby one-way torque transfer may occur between said plates, each said opposite edge having first and second corners;

wherein each said strut pocket is sufficiently enlarged to allow pivotal movement of each strut about a strut axis which is parallel with said common axis, thereby enabling one of said first and second corners to be selectively supported by one of said inner and outer circumferential rails to prevent the struts from slapping against the notch recesses as the notch plate and pocket plate are respectively counterrotated.

2. The overrunning coupling of claim 1, wherein said pocket plate is integral with a coupling body, and said notch plate is positioned within the coupling body.

3. The overrunning coupling of claim 1, wherein each said strut pocket is configured to allow said pivotal movement of each strut about the strut axis to a position in which said first corner is supported by said outer circumferential rail during high speed counterrotation.

4. The overrunning coupling of claim 1, wherein said pocket plate is stationary and each said strut pocket is configured to allow said pivotal movement of each strut about the strut axis to a position in which said second corner is supported by said inner circumferential rail.

5. An overrunning coupling comprising:

a notch plate and an annular coupling pocket plate positioned in face-to-face relationship with respect to each other along a common axis;

said pocket plate having strut pockets disposed at angularly spaced positions about said common axis;

said notch plate having notch recesses at angularly spaced positions about said common axis and positioned in juxtaposed relationship with respect to said strut pockets, said notch plate including an outer circumferential rail at a radially outward side of the notch recesses; and torque-transmitting struts in said strut pockets, each strut having first and second ears at one edge thereof for enabling pivotal motion of the struts about an ear axis intersecting the ears, the opposite edge of each strut being engageable with one of said notch recesses whereby one-way torque transfer may occur between said plates, each said opposite edge having a corner;

wherein each said strut pocket is sufficiently enlarged to allow pivotal movement of each strut about a strut axis which is perpendicular to said ear axis, thereby enabling said corner to be selectively supported by said outer circumferential rail to prevent the struts from rattling against the notch recesses as the notch plate and pocket plate are respectively counterrotated.

6. The overrunning coupling of claim 5, wherein said pocket plate is integral with a coupling body, and said notch plate is positioned within the coupling body.

7. An overrunning coupling comprising:

a notch plate and an annular coupling pocket plate positioned in face-to-face relationship with respect to each other along a common axis;

said pocket plate having strut pockets disposed at angularly spaced positions about said common axis;

said notch plate having notch recesses at angularly spaced positions about said common axis and positioned in juxtaposed relationship with respect to said strut pockets, said notch plate including an inner circumferential rail at a radially inward side of the notch recesses and an outer circumferential rail at a radially outward side of the notch recesses; and torque-transmitting struts in said pockets, each strut being pivotable for engagement with one of the notch recesses whereby one-way torque transfer may occur between said plates, each said strut including a corner;

wherein each said strut pocket is sufficiently enlarged to allow radial sliding movement of each strut between a first position in which the strut is aligned with the notch recesses and a second position in which the corner of the strut is supported by one of said inner and outer circumferential rails to prevent the strut from rattling against the notch recesses as the notch plate and pocket plate are respectively counterrotated.

8. The overrunning coupling of claim 7, wherein said pocket plate is integral with a coupling body, and said notch plate is positioned within the coupling body.

9. The overrunning coupling of claim 7, wherein each said strut pocket is configured to allow said sliding movement of each strut to a position in which said corner is supported by said outer circumferential rail during high speed counterrotation.

10. The overrunning coupling of claim 7, wherein said pocket plate is stationary and each said strut pocket is configured to allow said sliding movement of each strut to a position in which said corner is supported by said inner circumferential rail.

11. The overrunning coupling of claim 10, wherein said notch plate, annular coupling, and strut are configured such that viscous and frictional drag causes said sliding movement to said position in which the corner is supported by said inner circumferential rail.

12. The overrunning coupling of claim 7, wherein said notch plate and annular coupling are configured such that said radial sliding movement of the struts occurs at a predetermined relative rotational speed.

* * * * *